United States Patent
Whinnery

(10) Patent No.: US 11,884,270 B2
(45) Date of Patent: Jan. 30, 2024

(54) SYSTEM AND METHOD FOR INTENT MONITORING OF OTHER ROAD ACTORS

(71) Applicant: Argo AI, LLC, Pittsburgh, PA (US)

(72) Inventor: Joseph Whinnery, Soquel, CA (US)

(73) Assignee: Argo AI, LLC, Pittsburgh, PA (US)

( * ) Notice: Subject to any disclaimer, the term of this patent is extended or adjusted under 35 U.S.C. 154(b) by 294 days.

(21) Appl. No.: 17/483,974

(22) Filed: Sep. 24, 2021

(65) Prior Publication Data
US 2023/0096284 A1  Mar. 30, 2023

(51) Int. Cl.
| | |
|---|---|
| B60W 30/095 | (2012.01) |
| H04W 4/40 | (2018.01) |
| B60W 60/00 | (2020.01) |
| G06V 40/16 | (2022.01) |
| G06V 40/20 | (2022.01) |
| G06V 20/56 | (2022.01) |
| G06F 18/22 | (2023.01) |

(52) U.S. Cl.
CPC .... *B60W 30/0956* (2013.01); *B60W 60/0015* (2020.02); *B60W 60/00274* (2020.02); *B60W 60/00276* (2020.02); *G06F 18/22* (2023.01); *G06V 20/56* (2022.01); *G06V 40/161* (2022.01); *G06V 40/20* (2022.01); *H04W 4/40* (2018.02); *B60W 2554/4026* (2020.02); *B60W 2554/4045* (2020.02); *B60W 2554/801* (2020.02)

(58) Field of Classification Search
None
See application file for complete search history.

(56) References Cited

U.S. PATENT DOCUMENTS

| | | | |
|---|---|---|---|
| 2014/0118855 A1* | 5/2014 | Whinnery | B62J 29/00 359/842 |
| 2018/0012093 A1* | 1/2018 | Micks | G06V 40/20 |
| 2019/0362168 A1 | 11/2019 | Micks et al. | |
| 2019/0382007 A1 | 12/2019 | Casas et al. | |

(Continued)

FOREIGN PATENT DOCUMENTS

DE  102014211507 A1  12/2015

OTHER PUBLICATIONS

Jiang et al., "Inferring User Intention using Gaze in Vehicles," ACM International Conference on Multimodal Interaction, Oct. 2018, pp. 1-9.

(Continued)

*Primary Examiner* — James J Lee
*Assistant Examiner* — Wenyuan Yang
(74) *Attorney, Agent, or Firm* — The Webb Law Firm

(57) ABSTRACT

Systems, methods, and autonomous vehicles may obtain one or more images associated with an environment surrounding an autonomous vehicle; determine, based on the one or more images, an orientation of a head worn item of protective equipment of an operator of a vehicle; determine, based on the orientation of the head worn item of protective equipment, a direction of a gaze of the operator and a time period associated with the direction of the gaze of the operator; determine, based on the direction of the gaze of the operator and the time period associated with the direction of the gaze of the operator, a predicted motion path of the vehicle; and control, based on the predicted motion path of the vehicle, at least one autonomous driving operation of the autonomous vehicle.

20 Claims, 9 Drawing Sheets

(56) References Cited

U.S. PATENT DOCUMENTS

2021/0157330 A1 5/2021 Tran
2021/0182609 A1 6/2021 Arar et al.

OTHER PUBLICATIONS

Gonzalez et al., "A Review of Motion Planning Techniques for Automated Vehicles", IEEE Transactions on Intelligent Transportation Systems, Apr. 2016, p. 1135-1145, vol. 17, No. 4.

* cited by examiner

SYSTEM AND METHOD FOR INTENT MONITORING OF OTHER ROAD ACTORS

BACKGROUND

1. Field

This disclosure relates generally to autonomous vehicles and, in some non-limiting embodiments or aspects, to intent monitoring of other road actors, such as vulnerable road users, and/or the like.

2. Technical Considerations

Safely navigating public roads with various modes and means of transportation present may use a working knowledge of applicable rules and regulations, how the applicable rules and regulations are practiced by various communities on various types of roadways, and/or an ability to accurately predict actions and/or intents of other traffic participants. An autonomous vehicle (e.g., a self-driving vehicle, etc.) may process various types of sensor data to build an understanding of what relevant traffic participants are present and/or to predict the intended motion of other traffic participants, which may be particularly relevant to higher powered short wheelbase vehicles, and especially relevant to two wheel single track vehicles, such as motorcycles, mopeds, scooters, bicycles, and/or the like.

Two wheel traffic participants are typically designated as vulnerable road users due to a lack of a protective enclosure surrounding the operators of these vehicles. For example, instead of being an enclosed vehicle "occupant", the exposed operators and passengers are typically designated as "riders". Understanding a motion intent of these vulnerable road users may be particularly helpful to improving safety and/or naturalistic collaboration of an autonomous vehicle with other traffic participants due to the ability of these vehicles to quickly develop non-holonomic lateral motion as they maneuver through traffic.

SUMMARY

Accordingly, provided are improved systems, methods, products, apparatuses, and/or devices for intent monitoring of other road actors.

According to some non-limiting embodiments or aspects, provided is a computer-implemented method, system, and autonomous vehicle that obtain one or more images associated with an environment surrounding an autonomous vehicle; determine, based on the one or more images, an orientation of a head worn item of protective equipment of an operator of a vehicle in the environment surrounding the autonomous vehicle; determine, based on the orientation of the head worn item of protective equipment, a direction of a gaze of the operator of the vehicle and a time period associated with the direction of the gaze of the operator of the vehicle; determine, based on the direction of the gaze of the operator of the vehicle and the time period associated with the direction of the gaze of the operator of the vehicle, a predicted motion path of the vehicle; and control, based on the predicted motion path of the vehicle, at least one autonomous driving operation of the autonomous vehicle.

Further embodiments or aspects are set forth in the following numbered clauses:

Clause 1. A computer-implemented method, comprising: obtaining, with at least one processor, one or more images associated with an environment surrounding an autonomous vehicle; determining, with the at least one processor, based on the one or more images, an orientation of a head worn item of protective equipment of an operator of a vehicle in the environment surrounding the autonomous vehicle; determining, with the at least one processor, based on the orientation of the head worn item of protective equipment, a direction of a gaze of the operator of the vehicle and a time period associated with the direction of the gaze of the operator of the vehicle; determining, with the at least one processor, based on the direction of the gaze of the operator of the vehicle and the time period associated with the direction of the gaze of the operator of the vehicle, a predicted motion path of the vehicle; and controlling, with the at least one processor, based on the predicted motion path of the vehicle, at least one autonomous driving operation of the autonomous vehicle.

Clause 2. The computer-implemented method of clause 1, wherein the head worn item of protective equipment includes at least one of a helmet and an eye protection device.

Clause 3. The computer-implemented method of clauses 1 or 2, wherein the orientation of the head worn item of protective equipment is determined relative to at least one of a centerline of the vehicle and one or more paths defined in the environment.

Clause 4. The computer-implemented method of any of clauses 1-3, further comprising: determining, with the at least one processor, based on the one or more images, a plurality of distances, from the autonomous vehicle, of a plurality of head worn items of protective equipment of a plurality of operators of a plurality of vehicles in the environment surrounding the autonomous vehicle; determining, with the at least one processor, based on the plurality of distances, a plurality of priorities associated with the plurality of vehicles; and determining, with the at least one processor, in an order according to the plurality of priorities, a plurality of predicted motion paths of the plurality of vehicles.

Clause 5. The computer-implemented method of any of clauses 1-4, wherein determining the orientation of the head worn item of protective equipment of the operator of the vehicle includes determining, based on the one or more images, an angle of the head worn item of protective equipment relative to at least one side mirror of the vehicle and a distance of the head worn item of protective equipment relative to the at least one side mirror of the vehicle, and wherein determining the direction of the gaze of the operator of the vehicle includes determining, based on the angle of the head worn item of protective equipment relative to the at least one side mirror of the vehicle and the distance of the head worn item of protective equipment relative to the at least one side mirror of the vehicle, the direction of the gaze of the operator of the vehicle to a rear of a side of the vehicle.

Clause 6. The computer-implemented method of any of clauses 1-5, wherein determining the direction of the gaze of the operator of the vehicle includes: obtaining vehicle characteristic data associated with a geometric spacing, a reflective surface normal, and an angular position of the at least one side mirror relative to a centerline of the vehicle and a steering axis of the vehicle; and determining, based on the angle of the head worn item of protective equipment relative to the at least one side mirror of the vehicle, the distance of the head worn item of protective equipment relative to the at least one side mirror of the vehicle, and the geometric spacing, the reflective surface normal, and the angular position of the at least one side mirror relative to the centerline of the vehicle and the steering axis of the vehicle, the direction of the gaze of the operator of the vehicle to the rear of the side of the vehicle.

Clause 7. The computer-implemented method of any of clauses 1-6, wherein obtaining vehicle characteristic data includes: receiving, with the at least one processor, via a wireless communication from the vehicle, the vehicle characteristic data associated with the geometric spacing, the reflective surface normal, and the angular position of the at least one side mirror relative to the centerline of the vehicle and the steering axis of the vehicle.

Clause 8. The computer-implemented method of any of clauses 1-7, wherein obtaining vehicle characteristic data includes: determining, with the at least one processor, based on the one or more images, a type of the vehicle; and determining, with the at least one processor, based on the type of the vehicle, the vehicle characteristic data associated with the geometric spacing, the reflective surface normal, and the angular position of the at least one side mirror relative to the centerline of the vehicle and the steering axis of the vehicle.

Clause 9. The computer-implemented method of any of clauses 1-8, wherein the vehicle includes a two wheel vehicle.

Clause 10. The computer-implemented method of any of clauses 1-9, wherein determining the predicted motion path of the vehicle further includes: determining, based on the direction of the gaze of the operator of the vehicle and the time period associated with the direction of the gaze of the operator of the vehicle, at least one path in the environment associated with the direction of the gaze of the operator of the vehicle; determining, based on the at least one path, one or more objects detected in the environment, and one or more vehicle constraints associated with the at least one path, an assessment associated with the at least one path, wherein the assessment includes a probability associated with the at least one path being one of a viable path, a non-viable path, and a compliant viable path; and determining, based on the at least one path and the assessment associated the at least one path, the predicted motion path of the vehicle.

Clause 11. A system, comprising: one or more processors programmed and/or configured to: obtain one or more images associated with an environment surrounding an autonomous vehicle; determine, based on the one or more images, an orientation of a head worn item of protective equipment of an operator of a vehicle in the environment surrounding the autonomous vehicle; determine, based on the orientation of the head worn item of protective equipment, a direction of a gaze of the operator of the vehicle and a time period associated with the direction of the gaze of the operator of the vehicle; determine, based on the direction of the gaze of the operator of the vehicle and the time period associated with the direction of the gaze of the operator of the vehicle, a predicted motion path of the vehicle; and control, based on the predicted motion path of the vehicle, at least one autonomous driving operation of the autonomous vehicle.

Clause 12. The system of clause 11, wherein the head worn item of protective equipment includes at least one of a helmet and an eye protection device.

Clause 13. The system of clauses 11 or 12, wherein the orientation of the head worn item of protective equipment is determined relative to at least one of a centerline of the vehicle and one or more paths defined in the environment.

Clause 14. The system of any of clauses 11-13, wherein the one or more processors are further programmed and/or configured to: determine, based on the one or more images, a plurality of distances, from the autonomous vehicle, of a plurality of head worn items of protective equipment of a plurality of operators of a plurality of vehicles in the environment surrounding the autonomous vehicle; determine, based on the plurality of distances, a plurality of priorities associated with the plurality of vehicles; and determine, in an order according to the plurality of priorities, a plurality of predicted motion paths of the plurality of vehicles.

Clause 15. The system of any of clauses 11-14, wherein the one or more processors are programmed and/or configured to determine the orientation of the head worn item of protective equipment of the operator of the vehicle by determining, based on the one or more images, an angle of the head worn item of protective equipment relative to at least one side mirror of the vehicle and a distance of the head worn item of protective equipment relative to the at least one side mirror of the vehicle, and wherein the one or more processors are programmed and/or configured to determine the direction of the gaze of the operator of the vehicle by determining, based on the angle of the head worn item of protective equipment relative to the at least one side mirror of the vehicle and the distance of the head worn item of protective equipment relative to the at least one side mirror of the vehicle, the direction of the gaze of the operator of the vehicle to a rear of a side of the vehicle.

Clause 16. The system of any of clauses 11-15, wherein the one or more processors are programmed and/or configured to determine the direction of the gaze of the operator of the vehicle by: obtaining vehicle characteristic data associated with a geometric spacing, a reflective surface normal, and an angular position of the at least one side mirror relative to a centerline of the vehicle and a steering axis of the vehicle; and determining, based on the angle of the head worn item of protective equipment relative to the at least one side mirror of the vehicle, the distance of the head worn item of protective equipment relative to the at least one side mirror of the vehicle, and the geometric spacing, the reflective surface normal, and the angular position of the at least one side mirror relative to the centerline of the vehicle and the steering axis of the vehicle, the direction of the gaze of the operator of the vehicle to the rear of the side of the vehicle.

Clause 17. The system of any of clauses 11-16, wherein the one or more processors are programmed and/or configured to obtain vehicle characteristic data by receiving, via a wireless communication from the vehicle, the vehicle characteristic data associated with the geometric spacing, the reflective surface normal, and the angular position of the at least one side mirror relative to the centerline of the vehicle and the steering axis of the vehicle.

Clause 18. The system of any of clauses 11-17, wherein the one or more processors are programmed and/or configured to obtain vehicle characteristic data by: determining, based on the one or more images, a type of the vehicle; and determining, based on the type of the vehicle, the vehicle characteristic data associated with the geometric spacing, the reflective surface normal, and the angular position of the at least one side mirror relative to the centerline of the vehicle and the steering axis of the vehicle.

Clause 19. The system of any of clauses 11-18, wherein the vehicle includes a two wheel vehicle.

Clause 20. The system of any of clauses 11-19, wherein the at least one processor determines the predicted motion path of the vehicle by: determining, based on the direction of the gaze of the operator of the vehicle and the time period associated with the direction of the gaze of the operator of the vehicle, at least one path in the environment associated with the direction of the gaze of the operator of the vehicle; determining, based on the at least one path, one or more objects detected in the environment, and one or more vehicle constraints associated with the at least one path, an assessment associated with the at least one path, wherein the assessment includes a probability associated with the at least one path being one of a viable path, a non-viable path, and a compliant viable path; and determining, based on the at least one path and the assessment associated the at least one path, the predicted motion path of the vehicle.

Clause 21. A computer program product comprising at least one non-transitory computer-readable medium including program instructions that, when executed by at least one processor, cause the at least one processor to: obtain one or more images associated with an environment surrounding an autonomous vehicle; determine, based on the one or more images, an orientation of a head worn item of protective equipment of an operator of a vehicle in the environment surrounding the autonomous vehicle; determine, based on the orientation of the head worn item of protective equipment, a direction of a gaze of the operator of the vehicle and a time period associated with the direction of the gaze of the operator of the vehicle; determine, based on the direction of the gaze of the operator of the vehicle and the time period associated with the direction of the gaze of the operator of the vehicle, a predicted motion path of the vehicle; and control, based on the predicted motion path of the vehicle, at least one autonomous driving operation of the autonomous vehicle.

Clause 22. The computer program product of clause 21, wherein the head worn item of protective equipment includes at least one of a helmet and an eye protection device.

Clause 23. The computer program product of clauses 21 or 22, wherein the orientation of the head worn item of protective equipment is determined relative to at least one of a centerline of the vehicle and one or more paths defined in the environment.

Clause 24. The computer program product of any of clauses 21-23, wherein the program instructions, when executed by the at least one processor, further cause the at least one processor to: determine, based on the one or more images, a plurality of distances, from the autonomous vehicle, of a plurality of head worn items of protective equipment of a plurality of operators of a plurality of vehicles in the environment surrounding the autonomous vehicle; determine, based on the plurality of distances, a plurality of priorities associated with the plurality of vehicles; and determine, in an order according to the plurality of priorities, a plurality of predicted motion paths of the plurality of vehicles.

Clause 25. The computer program product of any of clauses 21-24, wherein the program instructions, when executed by the at least one processor, further cause the at least one processor to: determine the orientation of the head worn item of protective equipment of the operator of the vehicle by determining, based on the one or more images, an angle of the head worn item of protective equipment relative to at least one side mirror of the vehicle and a distance of the head worn item of protective equipment relative to the at least one side mirror of the vehicle; and determine the direction of the gaze of the operator of the vehicle by determining, based on the angle of the head worn item of protective equipment relative to the at least one side mirror of the vehicle and the distance of the head worn item of protective equipment relative to the at least one side mirror of the vehicle, the direction of the gaze of the operator of the vehicle to a rear of a side of the vehicle.

Clause 26. The computer program product of any of clauses 21-25, wherein the program instructions, when executed by the at least one processor, further cause the at least one processor to determine the direction of the gaze of the operator of the vehicle by: obtaining vehicle characteristic data associated with a geometric spacing, a reflective surface normal, and an angular position of the at least one side mirror relative to a centerline of the vehicle and a steering axis of the vehicle; and determining, based on the angle of the head worn item of protective equipment relative to the at least one side mirror of the vehicle, the distance of the head worn item of protective equipment relative to the at least one side mirror of the vehicle, and the geometric spacing, the reflective surface normal, and the angular position of the at least one side mirror relative to the centerline of the vehicle and the steering axis of the vehicle, the direction of the gaze of the operator of the vehicle to the rear of the side of the vehicle.

Clause 27. The computer program product of any of clauses 21-26, wherein the program instructions, when executed by the at least one processor, further cause the at least one processor to obtain vehicle characteristic data by receiving, via a wireless communication from the vehicle, the vehicle characteristic data associated with the geometric spacing, the reflective surface normal, and the angular position of the at least one side mirror relative to the centerline of the vehicle and the steering axis of the vehicle.

Clause 28. The computer program product of any of clauses 21-27, wherein the program instructions, when executed by the at least one processor, further cause the at least one processor to obtain vehicle characteristic data by: determining, based on the one or more images, a type of the vehicle; and determining, based on the type of the vehicle, the vehicle characteristic data associated with the geometric spacing, the reflective surface normal, and the angular position of the at least one side mirror relative to the centerline of the vehicle and the steering axis of the vehicle.

Clause 29. The computer program product of any of clauses 21-28, wherein the vehicle includes a two wheel vehicle.

Clause 30. The computer program product of any of clauses 21-29, wherein the program instructions, when executed by the at least one processor, further cause the at least one processor to determine the predicted motion path of the vehicle by: determining, based on the direction of the gaze of the operator of the vehicle and the time period associated with the direction of the gaze of the operator of the vehicle, at least one path in the environment associated with the direction of the gaze of the operator of the vehicle; determining, based on the at least one path, one or more objects detected in the environment, and one or more vehicle constraints associated with the at least one path, an assessment associated with the at least one path, wherein the assessment includes a probability associated with the at least one path being one of a viable path, a non-viable path, and a compliant viable path; and determining, based on the at least one path and the assessment associated the at least one path, the predicted motion path of the vehicle.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
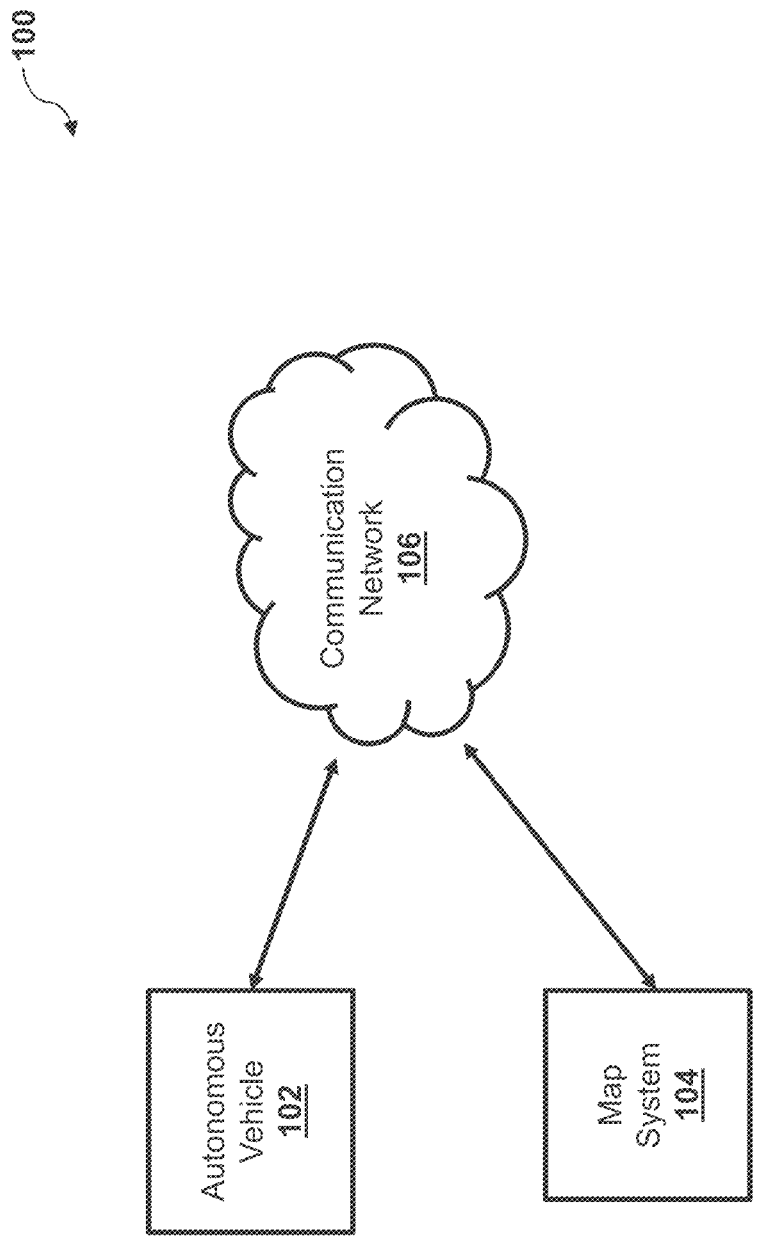
FIG. 1 is a diagram of non-limiting embodiments or aspects of an environment in which systems, methods, products, apparatuses, and/or devices, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

General solutions for predicting motion of other traffic participants typically depend on an autonomous vehicle sensing unified boundary extents of a total object and calculating an estimated outer extent of a bounding box around the total object. These solutions may be necessary and valuable to ensure that collisions are avoided. An estimation of a total momentum (e.g., a speed and a direction of mass) combined with an awareness of an allowable vehicle movement within a drivable area may be useful for estimating future intended motion of other traffic participants, and may be generally applicable to all vehicles, but may be less accurate and/or too slow for two wheel traffic participants due to an ability of these smaller and quicker vehicles to achieve much more dynamic motion paths in a shorter period of time (e.g., accelerations two to three times greater than a majority of automobiles, etc.).

Traffic participants typically observe where other road users are looking to anticipate or predict the intended motion of other road users. For example, many professional driving instructors train students with the mantra "look where you want to go". Drivers and riders thus typically look at their intended direction of motion. Although a vehicle enclosure may obscure an ability to see a direction of a gaze of a driver of a car or truck, there is typically very little occlusion between sensors used by an autonomous vehicle and a rider or operator of a two wheel vehicle, such as a motorcycle, a bicycle, and/or the like. Moreover, riders often utilize a narrow field of focus for observing and assessing that their forward motion path is free of obstruction and/or intrusion from other road actors. This narrow focus may be designated as Foveal vision, which may cover a range of about 20 degrees around an axis drawn from the normal to the eye drawn from the center of the retina forward through the pupil.

A majority of U.S. states and transportation authorities require the use of Department of Transportation (DOT) approved helmets and/or eye protection by motorcycle and/or bicycle riders on public roads. These helmets and/or eye protection may have a distinctive asymmetric (e.g., anisotropic, etc.) shape, and detecting an orientation of this asymmetric shape may enable a determination of a direction in which a rider is looking with a high degree of statistical confidence.

Non-limiting embodiments or aspects of the present disclosure provide for systems, methods, and autonomous vehicles that obtain one or more images associated with an environment surrounding an autonomous vehicle; determine, based on the one or more images, an orientation of a head worn item of protective equipment of an operator of a vehicle in the environment surrounding the autonomous vehicle; determine, based on the orientation of the head worn item of protective equipment, a direction of a gaze of the operator of the vehicle and a time period associated with the direction of the gaze of the operator of the vehicle; determine, based on the direction of the gaze of the operator of the vehicle and the time period associated with the direction of the gaze of the operator of the vehicle, a predicted motion path of the vehicle; and control, based on the predicted motion path of the vehicle, at least one autonomous driving operation of the autonomous vehicle.

In this way, non-limiting embodiments or aspects of the present disclosure provide for more accurate and/or faster anticipation of an intended motion path (e.g., a desired lateral movement or maneuver, etc.) of a two wheel rider and controlling an autonomous vehicle (e.g., to slow down, to speed up, to bias lateral positioning within a lane or roadway, etc.) in response thereto, which enables improved autonomous vehicle and/or vulnerable road user safety and/or more healthy collaboration between an autonomous vehicle and neighboring traffic participants.

Referring now to FIG. 1, FIG. 1 is a diagram of an example environment 100 in which systems, methods, products, apparatuses, and/or devices described herein, may be implemented. As shown in FIG. 1, environment 100 may include autonomous vehicle 102, map system 104, and/or communication network 106.

Autonomous vehicle 102 may include one or more devices capable of receiving information and/or data from map system 104 via communication network 106 and/or communicating information and/or data to map system 104 via communication network 106. For example, autonomous vehicle may include a computing device, such as a server, a group of servers, and/or other like devices.

Map system 104 may include one or more devices capable of receiving information and/or data from autonomous vehicle 102 via communication network 106 and/or communicating information and/or data to autonomous vehicle 102 via communication network 106. For example, map system 104 may include a computing device, such as a server, a group of servers, and/or other like devices.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 102 may incorporate the functionality of map system 104 such that autonomous vehicle 102 can operate without communication to or from map system 104. Additionally, or alternatively, a set of devices and/or systems (e.g., one or more devices or systems) of environment 100 may perform one or more functions described as being performed by another set of devices and/or systems of environment 100.

Figure 2:
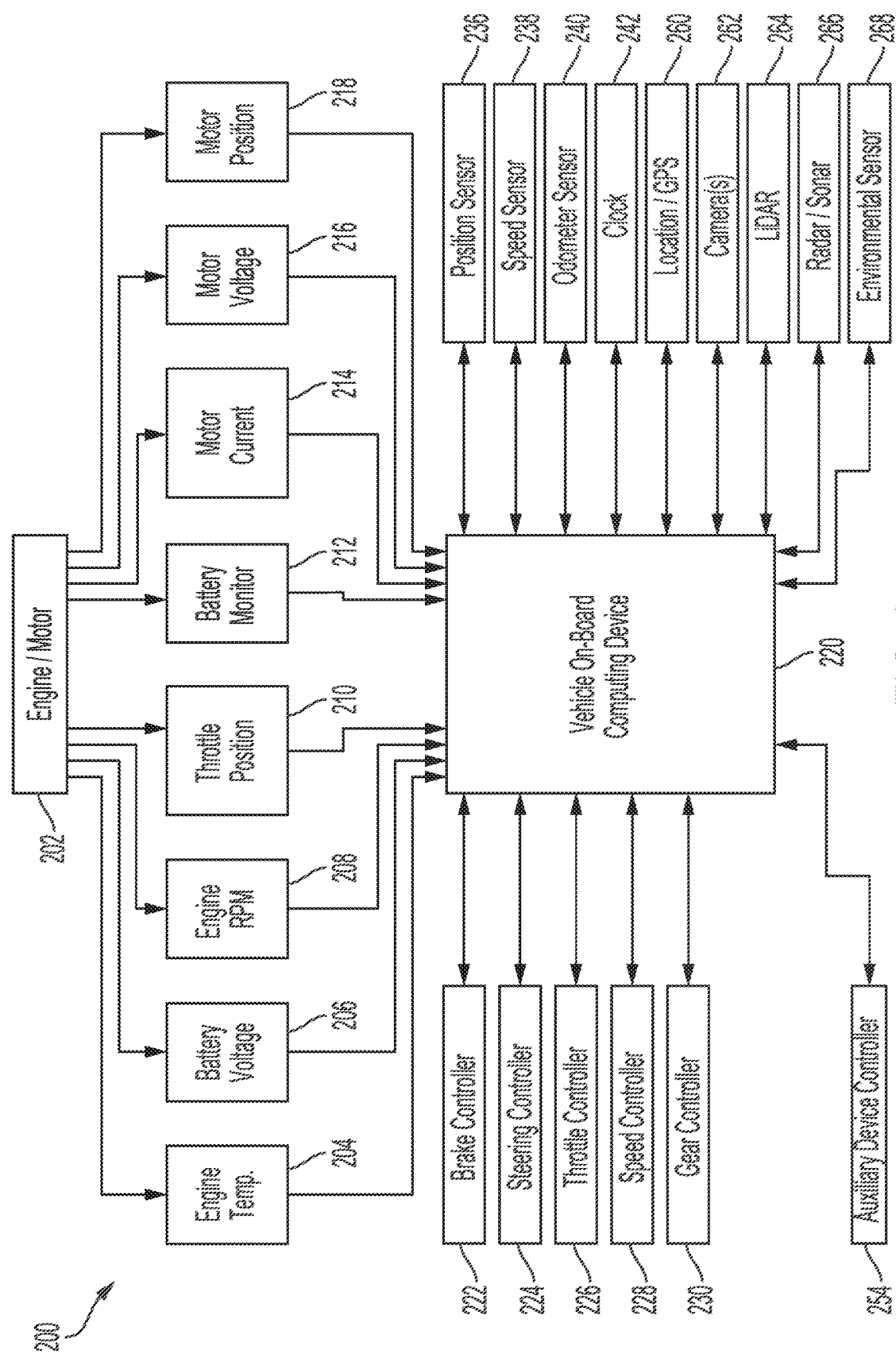
FIG. 2 is an illustration of an illustrative architecture for a vehicle.

Referring now to FIG. 2, FIG. 2 is an illustration of an illustrative system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations Per Minute ("RPM") sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System ("GPS") device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment including map data that corresponds to the location information to determine known fixed features of the environment such as streets, buildings, stop signs and/or stop/go signals, and/or vehicle constraints (e.g., driving rules or regulations, etc.). Captured images and/or video from cameras 262 and/or object detection information captured from sensors such as LiDAR sensor system 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document.

Figure 3:
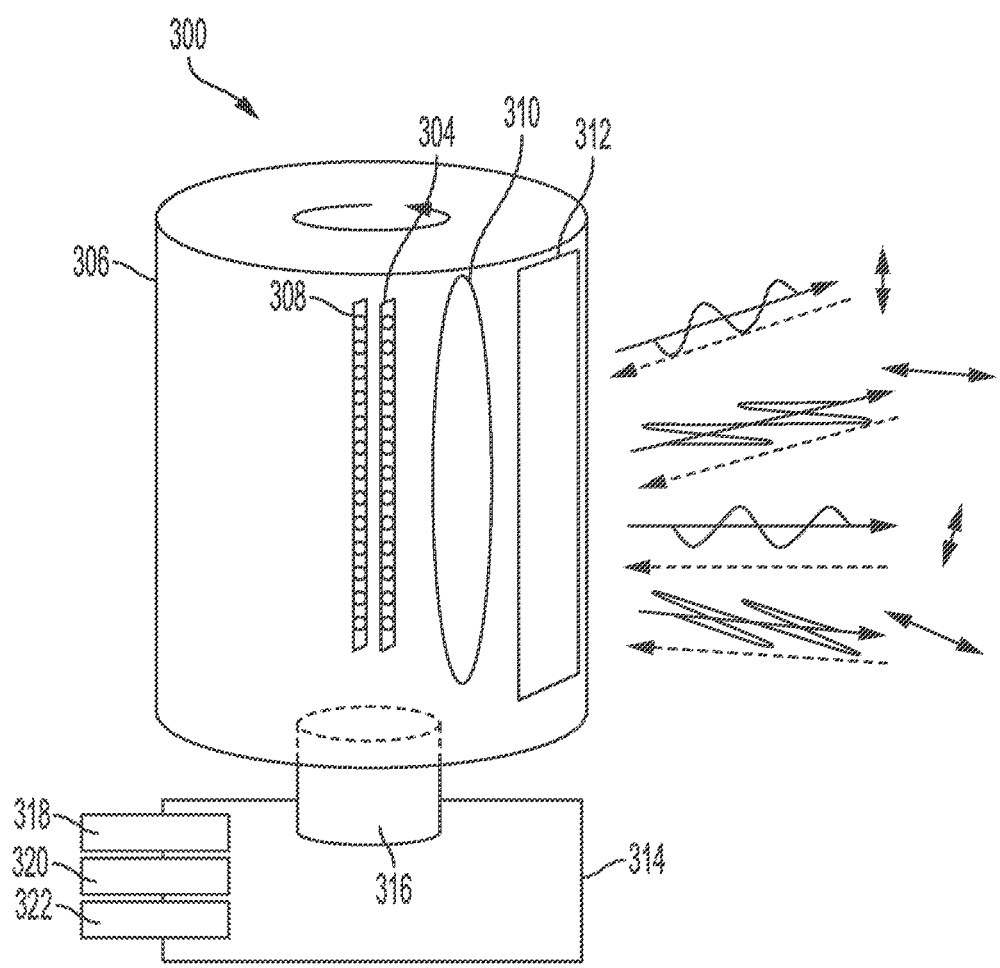
FIG. 3 is an illustration of an illustrative architecture for a LiDAR system.

Referring now to FIG. 3, FIG. 3 is an illustration of an illustrative LiDAR system 300. Li DAR sensor system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 3, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Light emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Light emitter system 304 and light detector 308 may rotate with the rotating shell, or light emitter system 304 and light detector 308 may rotate inside the stationary dome of housing 306. One or more optical element structures 310 may be positioned in front of light emitter system 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitter system 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
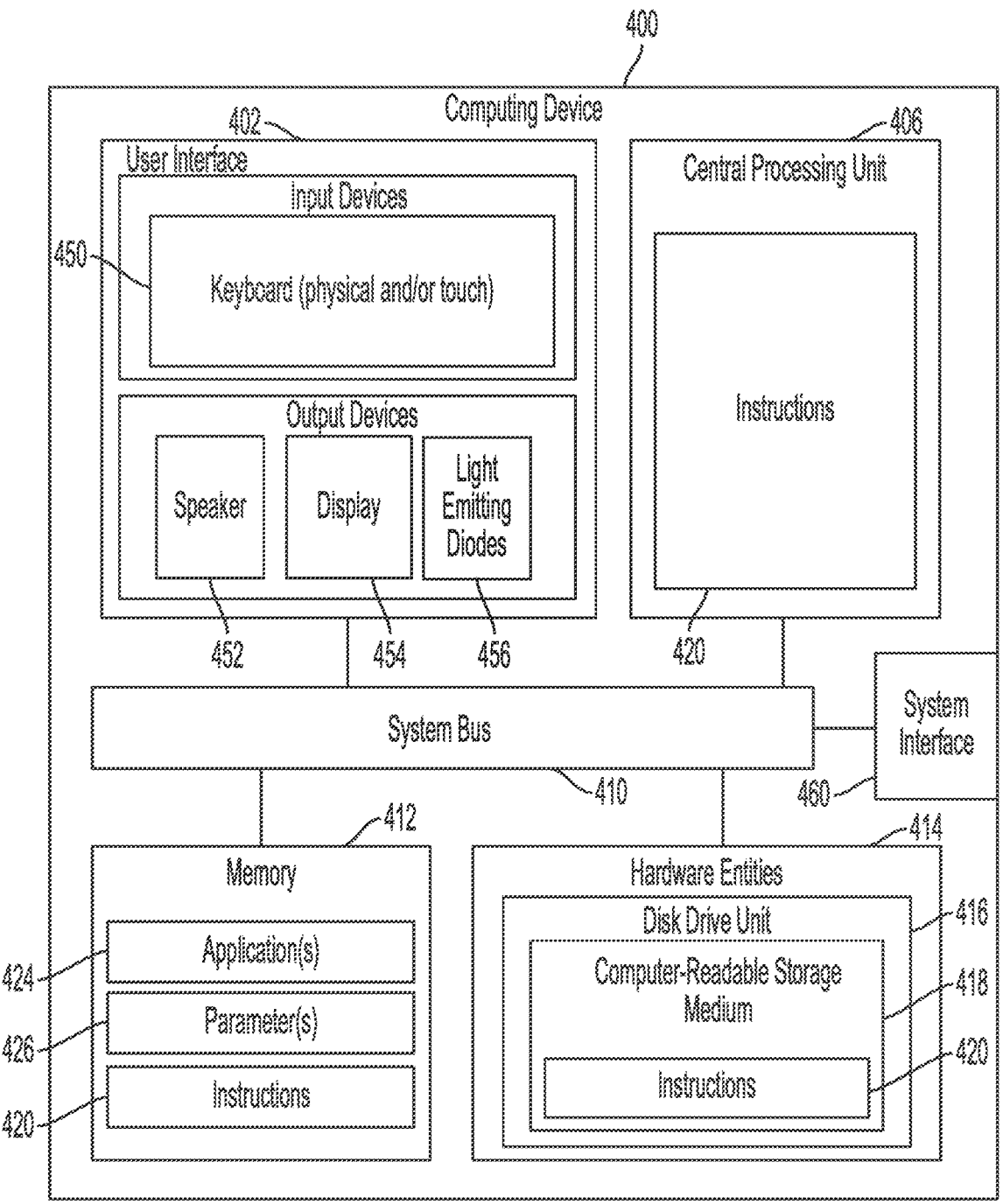
FIG. 4 is an illustration of an illustrative computing device.

Referring now to FIG. 4, FIG. 4 is an illustration of an illustrative architecture for a computing device 400. Computing device 400 can correspond to one or more devices of (e.g., one or more devices of a system of) autonomous vehicle 102 (e.g., one more devices of system architecture 200, etc.) and/or one or more devices of map system 104. In some non-limiting embodiments or aspects, one or more devices of (e.g., one or more devices of a system of) autonomous vehicle 102 (e.g., one or more devices of system architecture 200, etc.) and/or one or more devices of map system 104 can include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit ("CPU") 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media", as used here, may refer to a single medium or multiple media (e.g., a centralized or distributed database, and/or associated caches and server) that store the one or more sets of instructions 420. The term "machine readable media", as used here, may refer to any medium that is capable of storing, encoding or carrying a set of instructions 420 for execution by computing device 400 and that cause computing device 400 to perform any one or more of the methodologies of the present disclosure.

Figure 5:
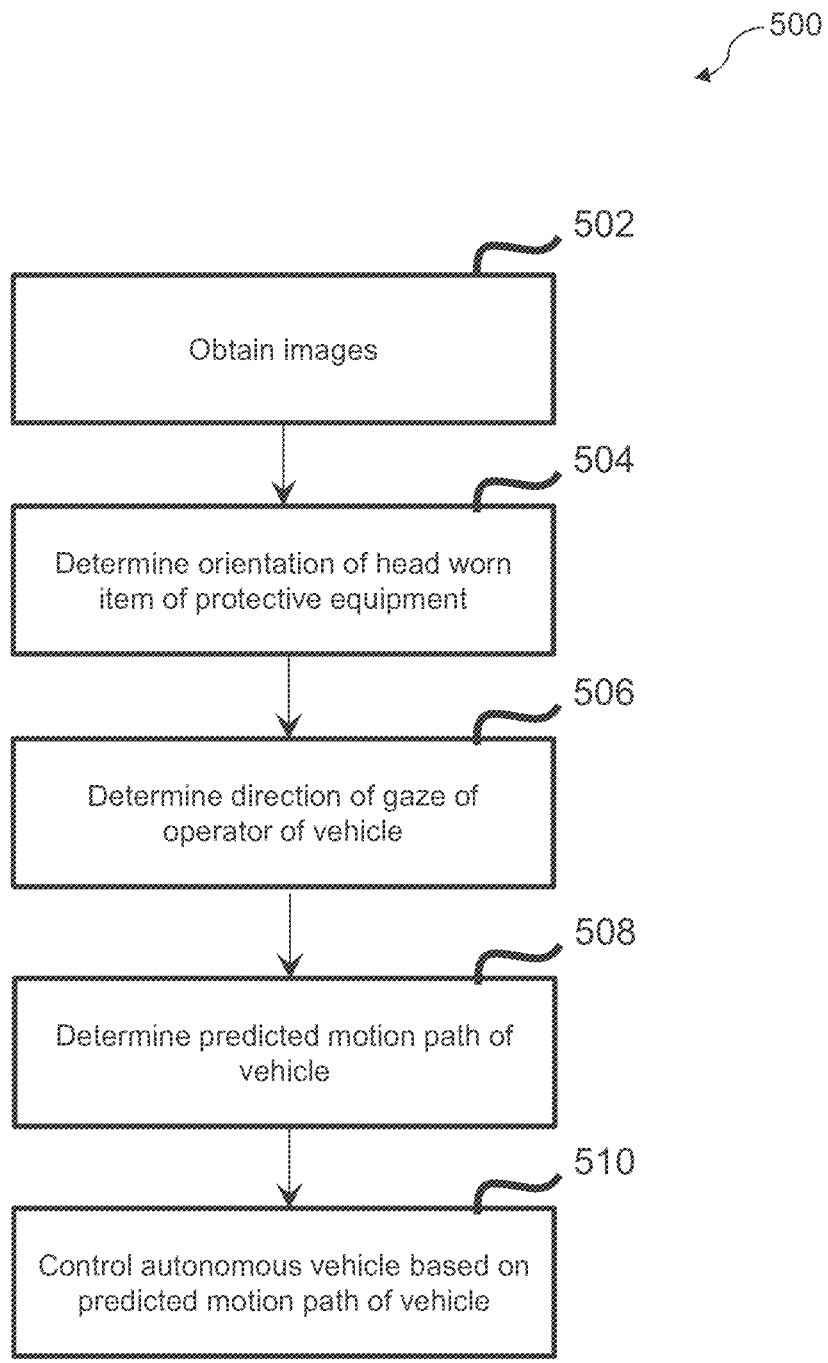
FIG. 5 is a flowchart of non-limiting embodiments or aspects of a process for intent monitoring of other road actors.

Referring now to FIG. 5, FIG. 5 is a flowchart of non-limiting embodiments or aspects of a process 500 for intent monitoring of other road actors. In some non-limiting embodiments or aspects, one or more of the steps of process 500 may be performed (e.g., completely, partially, etc.) by autonomous vehicle 102 (e.g., system architecture 200, etc.). In some non-limiting embodiments or aspects, one or more of the steps of process 500 may be performed (e.g., completely, partially, etc.) by another device or a group of devices separate from or including autonomous vehicle 102 (e.g., system architecture 200, etc.), such as map system 104 (e.g., one or more devices of map system 104, etc.).

As shown in FIG. 5, at step 502, process 500 includes obtaining images. For example, autonomous vehicle 102 (e.g., system architecture 200, etc.) may obtain one or more images associated with an environment surrounding autonomous vehicle 102. As an example, autonomous vehicle 102 (e.g., LiDAR system 300, camera 262, etc.) may determine sensor data associated with an environment surrounding autonomous vehicle 102, and the sensor data may be associated with one or more images (e.g., a plurality of images captured over a period of time, etc.) of the environment surrounding autonomous vehicle 102.

In some non-limiting embodiments or aspects, an image may include a LiDAR image associated with a point cloud including a plurality of points associated with a plurality of intensities and/or a camera image including a plurality of pixels associated with a plurality of pixel values. In such an example, an amount of data collected (e.g., via LiDAR system 300, via camera 262, etc.) for objects that are closer to autonomous vehicle 102 may be much greater than an amount of data collected for objects that are farther from autonomous vehicle 102. For example, for LiDAR system 300, there may be many more returns in a much denser pattern for objects closer to autonomous vehicle 102. Similarly, a number of pixels occupied by an object may be greater the closer the object is to autonomous vehicle 102.

As shown in FIG. 5, at step 504, process 500 includes determining an orientation of a head worn item of protective equipment. For example, autonomous vehicle 102 (e.g., system architecture 200, etc.) may determine, based on the one or more images, an orientation of a head worn item of protective equipment of an operator of a vehicle in the environment surrounding autonomous vehicle 102 and/or a time period associated with the orientation of the head worn item of protective equipment. In such an example, autonomous vehicle 102 (e.g., system architecture 200, etc.) may determine the orientation of the head worn item of protective equipment relative to at least one of a centerline of the vehicle and one or more paths defined in the environment. For example, autonomous vehicle 102 (e.g., system architecture 200, etc.) may apply one or more object detection techniques and/or one or more classification techniques to the one or more images to determine the centerline of the vehicle and/or the orientation of the head worn item of protective equipment (e.g., a centerline of the head worn item of protective equipment, etc.) relative to the centerline of the vehicle and/or one or more paths defined in the environment.

A path may include one or more trajectories defined in the environment surrounding autonomous vehicle 102. A path may be associated with a map of the environment (e.g., a map of a geographic location including the environment, etc.) including a roadway, and/or the like. A path may extend between points or locations in the map. For example, a path may define a path of travel on a roadway or other area for autonomous vehicle 102 and/or a predicted path of travel on the roadway (e.g., in a lane, across lanes, between lanes/part-way in one lane part-way in another lane, etc.) or other area (e.g., in a sidewalk, in a median, etc.) for another vehicle. As an example, a path may define a centerline of a roadway or lane in the roadway.

Figure 7C:
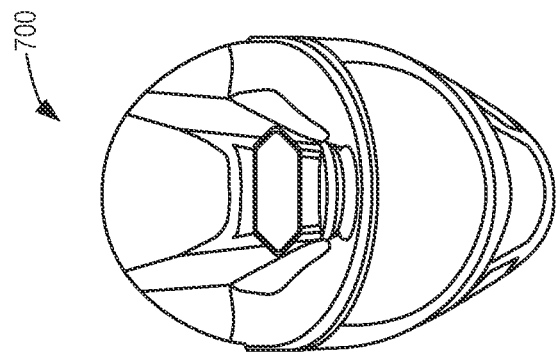
FIGS. 7A-7C are perspective views of non-limiting embodiments or aspects of an implementation of a head worn item of protective equipment.
Figure 7B:
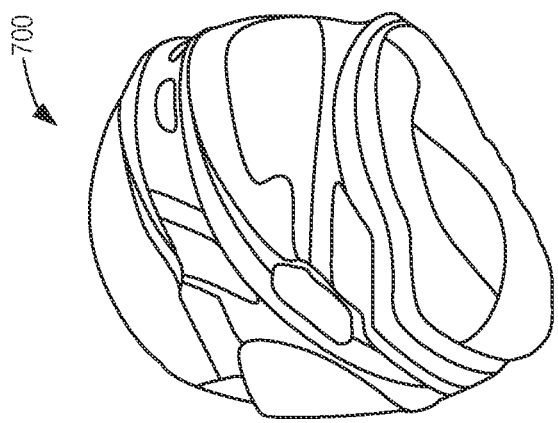
Figure 7A:
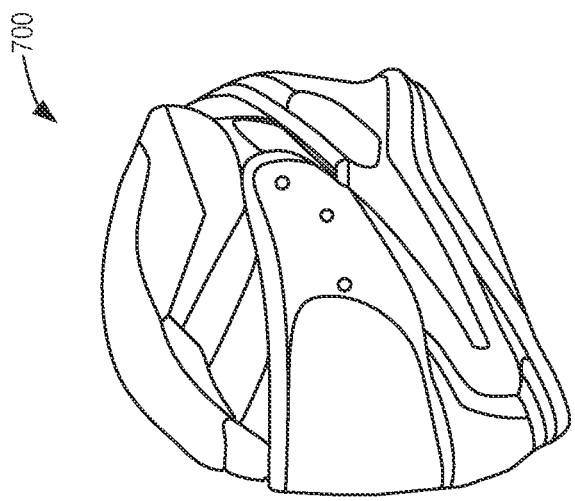

In some non-limiting embodiments or aspects, a head worn item of protective equipment includes at least one of the following items of protective equipment: a helmet, an eye protection device (e.g., goggles, etc.), or any combination thereof. For example, and referring also to FIGS. 7A-7C, an implementation 700 of a helmet may include a polycarbonate composite with a glossy protective paint coating that provides a uniform high reflectivity in LiDAR images captured by LiDAR system 300 and processed by system architecture 200 to determine an orientation of the helmet and, as described herein in more detail below, a likely focus of an intended future motion path of the operator for the vehicle. As an example, and still referring to FIGS. 7A-7C, patterns and/or designs (e.g., structural patterns and/or designs, graphical patterns or designs, etc.) of the implementation 700 of a helmet may be captured in camera images by camera 262 and processed by system architecture 200 to determine an orientation of the helmet and, as described herein in more detail below, a likely focus of an intended future motion path of the operator for the vehicle. In such an example, an extent of a pattern and/or design visible to camera 262 may be dependent on a portion of the helmet normal to a field of view of camera 262, and/or an ability of camera 262 to capture the pattern and/or design may improve as a distance between camera 262 and the helmet decreases.

In some non-limiting embodiments or aspects, a vehicle may include a two wheel vehicle (e.g., a vehicle consisting of two wheels, etc.). For example, a two wheel vehicle may include a motorcycle, a moped or scooter, a bicycle, and/or the like. As an example, and referring also to FIGS. 8A-8C, an implementation 800 of a two wheel vehicle may include a motorcycle including side mirrors 802 and an operator wearing a helmet 804.

In some non-limiting embodiments or aspects, autonomous vehicle 102 (e.g., system architecture 200, etc.) may determine the orientation of the head worn item of protective equipment of the operator of the vehicle by determining, based on the one or more images (e.g., using one or more object detection techniques and/or one or more classification techniques, etc.), an angle of the head worn item of protective equipment relative to at least one side mirror of the vehicle and a distance of the head worn item of protective equipment relative to the at least one side mirror of the vehicle.

As shown in FIG. 5, at step 506, process 500 includes determining a direction of a gaze of an operator of a vehicle. For example, autonomous vehicle 102 (e.g., system architecture 200, etc.) may determine, based on the orientation of the head worn item of protective equipment, a direction of a gaze of the operator of the vehicle and a time period associated with the direction of the gaze of the operator of the vehicle. As an example, autonomous vehicle 102 (e.g., system architecture 200, etc.) may determine the direction of the gaze of the operator of the vehicle with respect to the centerline of the head worn item of protective equipment. In such an example, autonomous vehicle 102 (e.g., system architecture 200, etc.) may map a statistical likelihood of a foveal vision portion of a field of view of the operator in the three-dimensional space with respect to the centerline of the head worn item of protective equipment.

In some non-limiting embodiments or aspects, autonomous vehicle 102 (e.g., system architecture 200, etc.) may measure a time period associated with a direction of a gaze of an operator of a vehicle at a resolution LiDAR sensor system 264, which may provide the one or more images upon which the direction and time period of the gaze is determined. For example, autonomous vehicle 102 (e.g., system architecture 200, etc.) may measure a time period associated with a direction of a gaze of an operator of a vehicle at a resolution of 33 ms (e.g., 30 frames/sec, etc.) for cameras and/or at a resolution of 50-100 ms for camera images synchronized to a sweep period of LiDAR sensor system 264. As an example, autonomous vehicle 102 (e.g., system architecture 200, etc.) may bin durations of a direction of the gaze into a plurality of bins, such as into a first bin of 200 ms or less, a second bin between 200 and 500 ms, and a third bin of greater than 500 ms, and/or the like.

In some non-limiting embodiments or aspects, autonomous vehicle 102 (e.g., system architecture 200, etc.) may determine the direction of the gaze of the operator of the vehicle by determining, based on the angle of the head worn item of protective equipment relative to the at least one side mirror of the vehicle and the distance of the head worn item of protective equipment relative to the at least one side mirror of the vehicle, the direction of the gaze of the operator of the vehicle to a rear of a side of the vehicle. For example, by detecting the orientation of the head worn item of protective equipment relative to a side mirror surface, autonomous vehicle 102 (e.g., system architecture 200, etc.) may determine, based on the relative orientation, when the operator of the vehicle is looking in the side mirror of the vehicle, which enables determining when a gaze and associated attention of the operator is directed to an immediate left rear area from the vehicle or an immediate right rear area from the vehicle of interest for assessing safety of an intended lateral motion for the vehicle equipped with side mirrors.

Figure 8A:
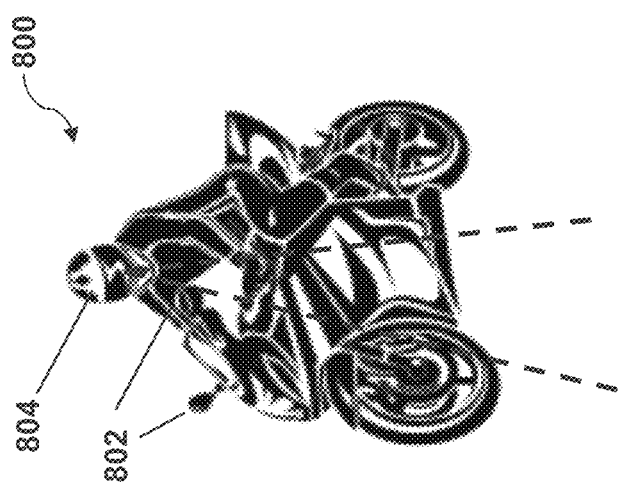
FIGS. 8A-8C are perspective views of non-limiting embodiments or aspects of an implementation of a two wheel vehicle.

In some non-limiting embodiments or aspects, a direction of a gaze of an operator of a vehicle may be directly to a left front area from the vehicle, directly to a right front area from the vehicle, or to another area on or directly ahead of the vehicle. For example, as shown in FIG. 8A, the direction of the gaze of the operator of the motorcycle is directly to a left front area from the vehicle.

Figure 8C:
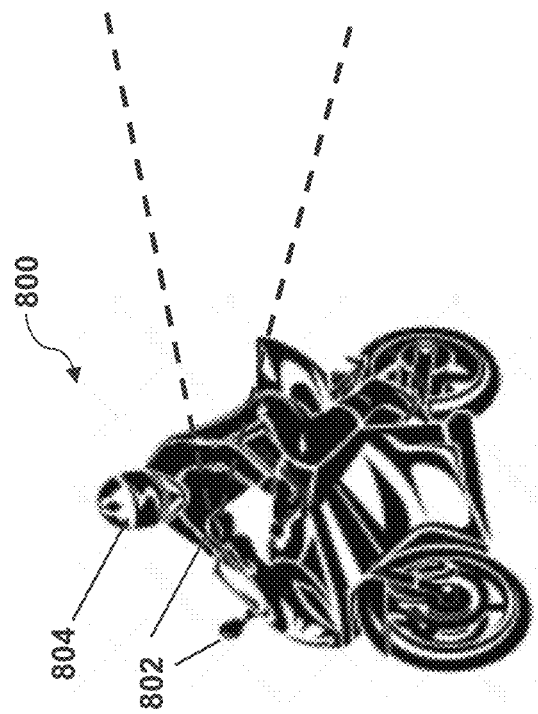
Figure 8B:
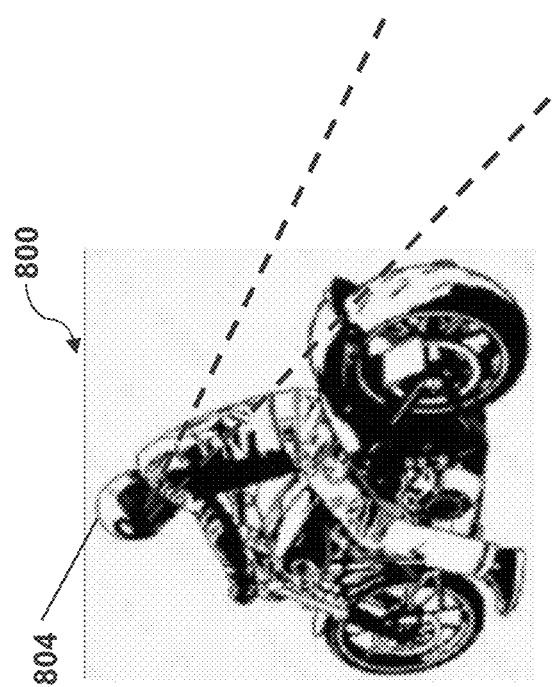

In some non-limiting embodiments or aspects, a direction of a gaze of an operator of a vehicle may be directly to a left rear area from the vehicle, directly to a right rear area from the vehicle, or to another area on or directly behind of the vehicle. For example, as shown in FIG. 8B, the direction of the gaze of the operator of the motorcycle is directly to a left rear area from the vehicle.

In some non-limiting embodiments or aspects, a direction of a gaze of an operator of a vehicle may be indirectly to a left rear area from the vehicle or indirectly to a right rear area from the vehicle. For example, as shown in FIG. 8C, the direction of the gaze of the operator of the motorcycle is indirectly (e.g., via side mirror 802, etc.) to a left rear area from the vehicle.

In some non-limiting embodiments or aspects, autonomous vehicle 102 (e.g., system architecture 200, etc.) may determine the direction of the gaze of the operator of the vehicle by obtaining vehicle characteristic data associated with a geometric spacing, a reflective surface normal, and an angular position of the at least one side mirror relative to a centerline of the vehicle and a steering axis of the vehicle (e.g., a steering axis as defined by a revolute joint between a rear frame of a two wheel vehicle and a front steering frame of the two wheel vehicle, etc.), and determining, based on the angle of the head worn item of protective equipment relative to the at least one side mirror of the vehicle, the distance of the head worn item of protective equipment relative to the at least one side mirror of the vehicle, and the geometric spacing, the reflective surface normal, and the angular position of the at least one side mirror relative to the centerline of the vehicle and the steering axis of the vehicle, the direction of the gaze of the operator of the vehicle to the rear of the side of the vehicle. Accordingly, with an estimate of a location of side mirrors of a two wheel vehicle, autonomous vehicle 102 (e.g., system architecture 200, etc.) may determine an accurate estimate for an available field of view (e.g., an available foveal vision, etc.) of a rider of the two wheel vehicle.

In some non-limiting embodiment or aspects, autonomous vehicle 102 (e.g., system architecture 200, etc.) may obtain vehicle characteristic data by receiving, via a wireless communication from the vehicle (e.g., with system interface 460, etc.), the vehicle characteristic data associated with the geometric spacing, the reflective surface normal, and the angular position of the at least one side mirror relative to the centerline of the vehicle and the steering axis of the vehicle. For example, the vehicle may broadcast vehicle characteristic data via a dedicated short range communication (DRSC) technology, and autonomous vehicle 102 (e.g., system architecture 200, etc.) may receive the broadcast characteristic data via system interface 460.

In some non-limiting embodiments or aspects, autonomous vehicle 102 (e.g., system architecture 200, etc.) may obtain vehicle characteristic data by determining, based on the one or more images (e.g., using one or more object detection techniques and/or one or more classification techniques, etc.), a type of the vehicle, and determining, based on the type of the vehicle, the vehicle characteristic data associated with the geometric spacing, the reflective surface normal, and the angular position of the at least one side mirror relative to the centerline of the vehicle and the steering axis of the vehicle. For example, autonomous vehicle 102 (e.g., system architecture 200, etc.) may access, using the determined type of the vehicle, a look-up table including vehicle characteristic data associated with a plurality of different types of vehicles.

Accordingly, non-limiting embodiments or aspects of the present disclosure may provide for tracking a position of a head worn item of protective equipment of a rider and more accurate and earlier dynamic calculation of a field of view of the rider, as well as when the rider accesses the field of view, and for how long, to determine what a vulnerable road user is looking at, and for how long, which enables improving an accuracy and a timing associated with predicting a near-term intent of two wheel vehicle vulnerable road users and an autonomous vehicle to plan a motion path in advance that increases safety and improves naturalistic collaboration with other traffic participants.

As shown in FIG. 5, at step 508, process 500 includes determining a predicted motion path of a vehicle. For example, autonomous vehicle 102 (e.g., system architecture 200, etc.) may determine, based on the direction of the gaze of the operator of the vehicle, the time period associated with the direction of the gaze of the operator of the vehicle, and/or sensor data associated with the environment surrounding the autonomous vehicle, a predicted motion path (e.g., a predicted trajectory, a path predicted to be traversed, etc.) of the vehicle.

In some non-limiting embodiments or aspects, autonomous vehicle 102 may generate a model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The machine learning model may be trained to provide an output including a predicted motion path (e.g., a predicted trajectory, a path predicted to be traversed, etc.) of a vehicle in response to input including a direction of a gaze of an operator of the vehicle and/or a time period associated with a direction of the gaze of the operator of the vehicle. For example, autonomous vehicle 102 may train the model based on training data associated with one or more directions of one or more gazes of one or more operators of one or more vehicles and/or one or more time periods associated with the one or more directions of the one or more gazes of the one or more operators of the one or more vehicles. In such an example, a predicted motion path may include a probability score associated with the motion path. For example, the predicted motion path may include a probability that the vehicle follows the predicted motion path.

In some non-limiting embodiments, autonomous vehicle 102 may store the model (e.g., store the model for later use). In some non-limiting embodiments or aspects, map system 104 may store the model in a data structure (e.g., a database, a linked list, a tree, etc.). In some non-limiting embodiments, the data structure is located within autonomous vehicle 102 or external (e.g., remote from) autonomous vehicle 102 (e.g., within map system 104, etc.).

In some non-limiting embodiments or aspects, a predicted motion path may include a predicted lateral movement or motion of a vehicle. For example, an advantage of non-limiting embodiments or aspects of the present disclosure is an ability to more accurately and earlier detect an intent of an operator or rider of a two wheel vehicle to perform an imminent lateral motion maneuver (e.g., changing lanes in a roadway, crossing lanes in a roadway, etc.). A head of an operator or rider typically turns in a direction of an intended lateral motion in order to directly observe and assess a risk of performing a lateral maneuver. For example, riders typically look to see if a lane is clear before changing lanes and/or turning. In this way, non-limiting embodiments or aspects of the present disclosure provide for monitoring a movement of a head of a rider (e.g., via detection of the rider's head worn item of protective equipment, etc.) and estimating a direction of a gaze of the rider, which enables autonomous vehicle 102 to respond to rider intent, rather than merely reacting to a lateral motion of a two wheel vehicle after the lateral motion has already been initiated.

Further details regarding non-limiting embodiments of step 508 of process 500 are provided below with regard to FIG. 6.

As shown in FIG. 5, at step 510, process 500 includes controlling an autonomous vehicle based on a predicted motion path of a vehicle. For example, autonomous vehicle 102 (e.g., system architecture 200, etc.) may control, based on the predicted motion path of the vehicle, at least one autonomous driving operation of autonomous vehicle 102 (e.g., control autonomous vehicle 102 to slow down, speed up, or bias lateral positioning within a lane or roadway, etc.). As an example, autonomous vehicle 102 traveling on a route or a path in a lane may determine, based on the predicted motion path of the vehicle, whether to proceed on the route or the path, yield to the vehicle, and/or alter the route or path.

Figure 6:
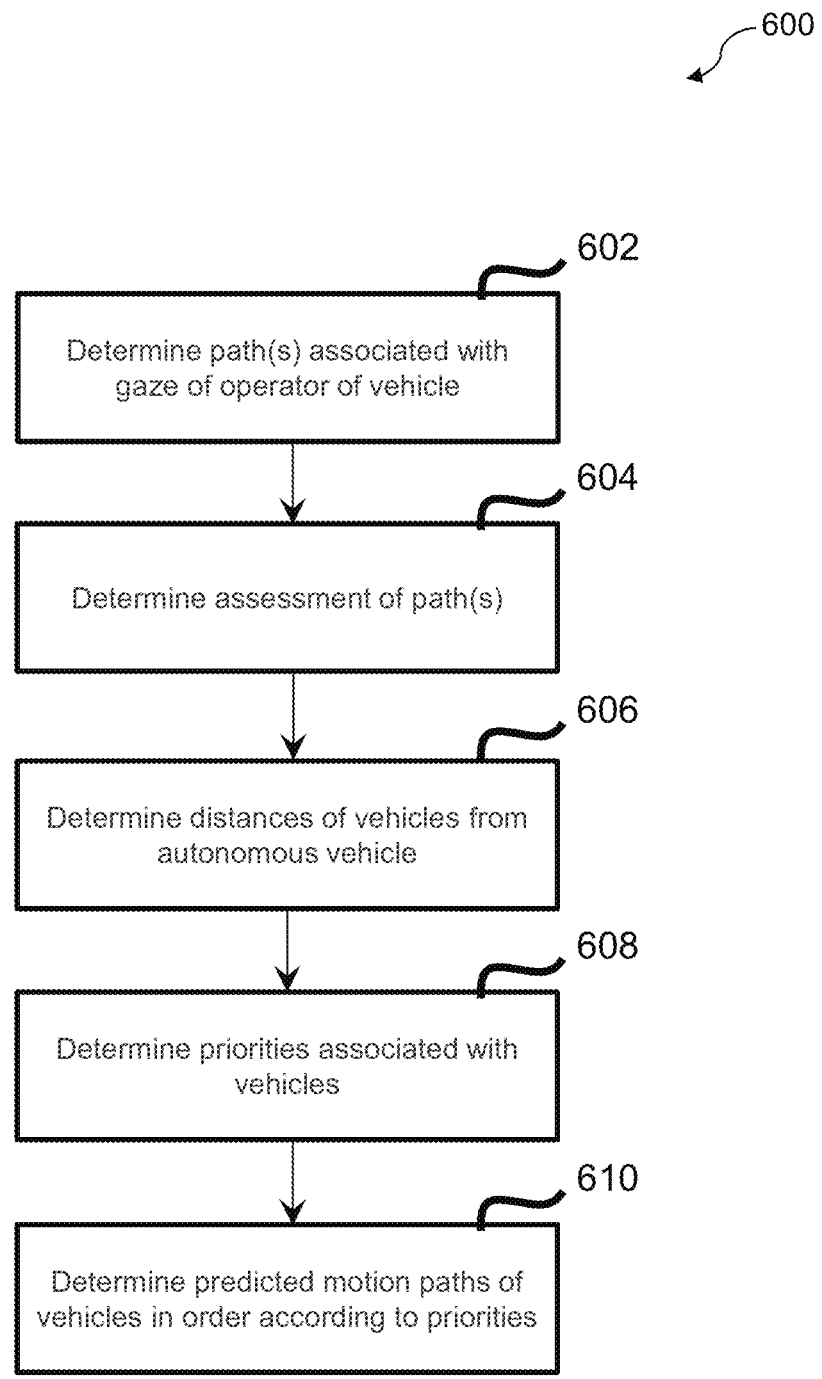
FIG. 6 is a flowchart of non-limiting embodiments or aspects of a process for intent monitoring of other road actors.

Referring now to FIG. 6, FIG. 6 is a flowchart of non-limiting embodiments or aspects of a process 600 for intent monitoring of other road actors. In some non-limiting embodiments or aspects, one or more of the steps of process 600 may be performed (e.g., completely, partially, etc.) by autonomous vehicle 102 (e.g., system architecture 200, etc.). In some non-limiting embodiments or aspects, one or more of the steps of process 600 may be performed (e.g., completely, partially, etc.) by another device or a group of devices separate from or including autonomous vehicle 102 (e.g., system architecture 200, etc.), such as map system 104 (e.g., one or more devices of map system 104, etc.).

As shown in FIG. 6, at step 602, process 600 includes determining at least one path associated with a direction of a gaze of an operator of a vehicle. For example, autonomous vehicle 102 (e.g., system architecture 200, etc.) may determine, based on the direction of the gaze of the operator of the vehicle, the time period associated with the direction of the gaze of the operator of the vehicle, map data, and/or one or more paths defined in the environment, at least one path in the environment associated with the direction of the gaze of the operator of the vehicle. As an example, autonomous vehicle 102 (e.g., system architecture 200, etc.) may determine at least one path in the environment that intersects with the direction of the gaze of the operator of the vehicle (e.g., that is a target of the foveal vision portion of the field of view of the operator, etc.).

In some non-limiting embodiments or aspects, autonomous vehicle 102 may generate a model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The machine learning model may be trained to provide an output including a path (e.g., a trajectory, a path in the environment, etc.) associated with a direction of a gaze of an operator of a vehicle in response to input including the direction of the gaze of the operator of the vehicle, a time period associated with the direction of the gaze of the operator of the vehicle, map data, and/or one or more paths defined in an environment. For example, autonomous vehicle 102 may train the model based on training data associated with one or more directions of one or more gazes of one or more operators of one or more vehicles, one or more time periods associated with the one or more directions of the one or more gazes of the one or more operators of the one or more vehicles, the map data, and/or one or more paths defined in an environment. In such an example, a path associated with a direction of a gaze may include a probability score associated with the path. For example, the path may include a probability that the path is the target of the gaze.

In some non-limiting embodiments, autonomous vehicle 102 may store the model (e.g., store the model for later use). In some non-limiting embodiments or aspects, map system 104 may store the model in a data structure (e.g., a database, a linked list, a tree, etc.). In some non-limiting embodiments, the data structure is located within autonomous vehicle 102 or external (e.g., remote from) autonomous vehicle 102 (e.g., within map system 104, etc.).

As shown in FIG. 6, at step 604, process 600 includes determining an assessment of at least one path associated with a direction of a gaze of an operator of a vehicle. For example, autonomous vehicle 102 (e.g., system architecture 200, etc.) may determine, based on the at least one path defined in the environment associated with the direction of the gaze of the operator of the vehicle, one or more objects detected in the environment (e.g., detected by autonomous vehicle 102 based on the one or more images, etc.), map data, and/or one or more vehicle constraints associated with the at least one path, an assessment of the at least one path associated with the direction of the gaze of the operator of the vehicle. As an example, an assessment of a path may include an indication and/or probability that the path is a viable motion path, a non-viable motion path, or a compliant viable motion path.

A vehicle constraint may be associated with a rule or regulation that a vehicle should follow, but which the vehicle may violate. For example, a vehicle constraint may prohibit vehicle actions associated with perceived static or dynamic objects in the environment and/or vehicle actions associated with restricted map areas. As an example, a vehicle constraint may identify regions in the environment and/or the map where operation of the vehicle is prohibited, but where the operator of the vehicle may choose to operate the vehicle anyways. In such an example, a vehicle constraint may include a one-way street, a sidewalk, and/or the like.

A viable motion path may include a path in the environment along which a vehicle may physically travel with or without violating a vehicle constraint. A non-viable motion path may include a path in the environment along which a vehicle cannot physically travel because the vehicle would encounter a hazard with which the vehicle cannot occupy the same space (e.g., a building, a parked car, etc.). A compliant viable motion path may include a path in the environment along which a vehicle may physically travel without violating a vehicle constraint.

In some non-limiting embodiments or aspects, autonomous vehicle 102 may generate a model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The machine learning model may be trained to provide an output including an assessment of at least one path associated with a direction of a gaze of an operator of a vehicle (e.g., an indication and/or probability that the path is a viable motion path, a non-viable motion path, or a compliant viable motion path, etc.) in response to input including the at least one path defined in the environment associated with the direction of the gaze of the operator of the vehicle, one or more objects detected in the environment, map data, and/or one or more vehicle constraints associated with the at least one path. For example, autonomous vehicle 102 may train the model based on training data associated with one or more paths defined in an environment, one or more objects detected in the environment, map data, and/or one or more vehicle constraints associated with the one or more paths. In such an example, an assessment may include a probability score associated with the assessment. For example, the assessment may include a probability that the path is a viable motion path, a non-viable motion path, or a compliant viable motion path.

In some non-limiting embodiments, autonomous vehicle 102 may store the model (e.g., store the model for later use). In some non-limiting embodiments or aspects, map system 104 may store the model in a data structure (e.g., a database, a linked list, a tree, etc.). In some non-limiting embodiments, the data structure is located within autonomous vehicle 102 or external (e.g., remote from) autonomous vehicle 102 (e.g., within map system 104, etc.).

In such an example, autonomous vehicle 102 (e.g., system architecture 200, etc.) may determine, based on the at least one path defined in the environment associated with the direction of the gaze of the operator of the vehicle, the assessment of the at least one path, the direction of the gaze of the operator of the vehicle, and/or the time period associated with the direction of the gaze of the operator of the vehicle, the predicted motion path (e.g., a predicted trajectory, a path predicted to be traversed, etc.) of the vehicle. For example, autonomous vehicle 102 may generate a model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The machine learning model may be trained to provide an output including a predicted motion path (e.g., a predicted trajectory, a path predicted to be traversed, etc.) of a vehicle in response to input including at least one path defined in an environment associated with a direction of a gaze of an operator of a vehicle, an assessment of the at least one path, the direction of the gaze of the operator of the vehicle, and/or a time period associated with a direction of the gaze of the operator of the vehicle. For example, autonomous vehicle 102 may train the model based on training data associated with one or more paths, one or more assessments of one or more paths, one or more directions of one or more gazes of one or more operators of one or more vehicles, and/or one or more time periods associated with the one or more directions of the one or more gazes of the one or more operators of the one or more vehicles. In such an example, a predicted motion path may include a probability score associated with the motion path. For example, the predicted motion path may include a probability that the vehicle follows the predicted motion path.

In some non-limiting embodiments, autonomous vehicle 102 may store the model (e.g., store the model for later use). In some non-limiting embodiments or aspects, map system 104 may store the model in a data structure (e.g., a database, a linked list, a tree, etc.). In some non-limiting embodiments, the data structure is located within autonomous vehicle 102 or external (e.g., remote from) autonomous vehicle 102 (e.g., within map system 104, etc.).

As shown in FIG. 6, at step 606, process 600 includes determining distances of vehicles from an autonomous vehicle. For example, autonomous vehicle 102 (e.g., system architecture 200, etc.) may determine, based on the one or more images, a plurality of distances, from autonomous vehicle 102, of a plurality of head worn items of protective equipment of a plurality of operators of a plurality of vehicles in the environment surrounding autonomous vehicle 102.

As shown in FIG. 6, at step 608, process 600 includes determining priorities associated with vehicles. For example, autonomous vehicle 102 (e.g., system architecture 200, etc.) may determine, based on the plurality of distances from autonomous vehicle 102, of the plurality of head worn items of protective equipment of the plurality of operators of the plurality of vehicles, a plurality of priorities associated with the plurality of vehicles. As an example, a need for autonomous vehicle 102 to accurately and/or quickly predict an intended, immediate future motion path may be greater for vehicles closer to autonomous vehicle 102 than for vehicles farther away from autonomous vehicle 102. Accordingly, autonomous vehicle 102 may prioritize processing resources to process the more relevant and accurate sensor data for vehicles closer to autonomous vehicle 102 whose intended motion is more directly relevant to more immediate motion control operations of autonomous vehicle 102.

As shown in FIG. 6, at step 610, process 600 includes determining predicted motion paths of vehicles (and/or determining orientations of head worn items of protective equipment of operators of the vehicles, and/or determining directions of gazes of operators of the vehicles) in an order according to priorities associated with the vehicles. For example, autonomous vehicle 102 (e.g., system architecture 200, etc.) may determine, in an order according to the plurality of priorities, a plurality of predicted motion paths of the plurality of vehicles (and/or orientations of head worn items of protective equipment of operators of the vehicles, and/or directions of gazes of the operators of the vehicles).

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
   obtaining, with at least one processor, one or more images associated with an environment surrounding an autonomous vehicle;
   determining, with the at least one processor, based on the one or more images, an orientation of a head worn item of protective equipment of an operator of a vehicle in the environment surrounding the autonomous vehicle;
   determining, with the at least one processor, based on the orientation of the head worn item of protective equipment, a direction of a gaze of the operator of the vehicle and a time period associated with the direction of the gaze of the operator of the vehicle;

determining, with the at least one processor, based on the direction of the gaze of the operator of the vehicle and the time period associated with the direction of the gaze of the operator of the vehicle, a predicted motion path of the vehicle; and controlling, with the at least one processor, based on the predicted motion path of the vehicle, at least one autonomous driving operation of the autonomous vehicle.

2. The computer-implemented method of claim 1, wherein the head worn item of protective equipment includes at least one of a helmet and an eye protection device.

3. The computer-implemented method of claim 1, wherein the orientation of the head worn item of protective equipment is determined relative to at least one of a centerline of the vehicle and one or more paths defined in the environment.

4. The computer-implemented method of claim 1, further comprising:

determining, with the at least one processor, based on the one or more images, a plurality of distances, from the autonomous vehicle, of a plurality of head worn items of protective equipment of a plurality of operators of a plurality of vehicles in the environment surrounding the autonomous vehicle;

determining, with the at least one processor, based on the plurality of distances, a plurality of priorities associated with the plurality of vehicles; and determining, with the at least one processor, in an order according to the plurality of priorities, a plurality of predicted motion paths of the plurality of vehicles.

5. The computer-implemented method of claim 1, wherein determining the orientation of the head worn item of protective equipment of the operator of the vehicle includes determining, based on the one or more images, an angle of the head worn item of protective equipment relative to at least one side mirror of the vehicle and a distance of the head worn item of protective equipment relative to the at least one side mirror of the vehicle, and wherein determining the direction of the gaze of the operator of the vehicle includes determining, based on the angle of the head worn item of protective equipment relative to the at least one side mirror of the vehicle and the distance of the head worn item of protective equipment relative to the at least one side mirror of the vehicle, the direction of the gaze of the operator of the vehicle to a rear of a side of the vehicle.

6. The computer-implemented method of claim 5, wherein determining the direction of the gaze of the operator of the vehicle includes:

obtaining vehicle characteristic data associated with a geometric spacing, a reflective surface normal, and an angular position of the at least one side mirror relative to a centerline of the vehicle and a steering axis of the vehicle; and determining, based on the angle of the head worn item of protective equipment relative to the at least one side mirror of the vehicle, the distance of the head worn item of protective equipment relative to the at least one side mirror of the vehicle, and the geometric spacing, the reflective surface normal, and the angular position of the at least one side mirror relative to the centerline of the vehicle and the steering axis of the vehicle, the direction of the gaze of the operator of the vehicle to the rear of the side of the vehicle.

7. The computer-implemented method of claim 6, wherein obtaining vehicle characteristic data includes:

receiving, with the at least one processor, via a wireless communication from the vehicle, the vehicle characteristic data associated with the geometric spacing, the reflective surface normal, and the angular position of the at least one side mirror relative to the centerline of the vehicle and the steering axis of the vehicle.

8. The computer-implemented method of claim 6, wherein obtaining vehicle characteristic data includes:

determining, with the at least one processor, based on the one or more images, a type of the vehicle; and determining, with the at least one processor, based on the type of the vehicle, the vehicle characteristic data associated with the geometric spacing, the reflective surface normal, and the angular position of the at least one side mirror relative to the centerline of the vehicle and the steering axis of the vehicle.

9. The computer-implemented method of claim 1, wherein the vehicle includes a two wheel vehicle.

10. The computer-implemented method of claim 1, wherein determining the predicted motion path of the vehicle further includes:

determining, based on the direction of the gaze of the operator of the vehicle and the time period associated with the direction of the gaze of the operator of the vehicle, at least one path in the environment associated with the direction of the gaze of the operator of the vehicle;

determining, based on the at least one path, one or more objects detected in the environment, and one or more vehicle constraints associated with the at least one path, an assessment associated with the at least one path, wherein the assessment includes a probability associated with the at least one path being one of a viable path, a non-viable path, and a compliant viable path; and determining, based on the at least one path and the assessment associated the at least one path, the predicted motion path of the vehicle.

11. A system, comprising:

one or more processors programmed and/or configured to:

obtain one or more images associated with an environment surrounding an autonomous vehicle;

determine, based on the one or more images, an orientation of a head worn item of protective equipment of an operator of a vehicle in the environment surrounding the autonomous vehicle;

determine, based on the orientation of the head worn item of protective equipment, a direction of a gaze of the operator of the vehicle and a time period associated with the direction of the gaze of the operator of the vehicle;

determine, based on the direction of the gaze of the operator of the vehicle and the time period associated with the direction of the gaze of the operator of the vehicle, a predicted motion path of the vehicle; and control, based on the predicted motion path of the vehicle, at least one autonomous driving operation of the autonomous vehicle.

12. The system of claim 11, wherein the one or more processors are programmed and/or configured to determine the orientation of the head worn item of protective equipment of the operator of the vehicle by determining, based on the one or more images, an angle of the head worn item of protective equipment relative to at least one side mirror of the vehicle and a distance of the head worn item of protective equipment relative to the at least one side mirror of the vehicle, and wherein the one or more processors are programmed and/or configured to determine the direction of the gaze of the operator of the vehicle by determining, based on the angle of the head worn item of protective equipment relative to the at least one side mirror of the vehicle and the distance of the head worn item of protective equipment relative to the at least one side mirror of the vehicle, the direction of the gaze of the operator of the vehicle to a rear of a side of the vehicle.

13. A computer program product comprising at least one non-transitory computer-readable medium including program instructions that, when executed by at least one processor, cause the at least one processor to:
    obtain one or more images associated with an environment surrounding an autonomous vehicle;
    determine, based on the one or more images, an orientation of a head worn item of protective equipment of an operator of a vehicle in the environment surrounding the autonomous vehicle;
    determine, based on the orientation of the head worn item of protective equipment, a direction of a gaze of the operator of the vehicle and a time period associated with the direction of the gaze of the operator of the vehicle;
    determine, based on the direction of the gaze of the operator of the vehicle and the time period associated with the direction of the gaze of the operator of the vehicle, a predicted motion path of the vehicle; and
    control, based on the predicted motion path of the vehicle, at least one autonomous driving operation of the autonomous vehicle.

14. The computer program product of claim 13, wherein the head worn item of protective equipment includes at least one of a helmet and an eye protection device.

15. The computer program product of claim 13, wherein the orientation of the head worn item of protective equipment is determined relative to at least one of a centerline of the vehicle and one or more paths defined in the environment.

16. The computer program product of claim 13, wherein program the instructions, when executed by the at least one processor, further cause the at least one processor to:
    determine, based on the one or more images, a plurality of distances, from the autonomous vehicle, of a plurality of head worn items of protective equipment of a plurality of operators of a plurality of vehicles in the environment surrounding the autonomous vehicle;
    determine, based on the plurality of distances, a plurality of priorities associated with the plurality of vehicles; and
    determine, in an order according to the plurality of priorities, a plurality of predicted motion paths of the plurality of vehicles.

17. The computer program product of claim 13, wherein the program instructions, when executed by the at least one processor, further cause the at least one processor to:
    determine the orientation of the head worn item of protective equipment of the operator of the vehicle by determining, based on the one or more images, an angle of the head worn item of protective equipment relative to at least one side mirror of the vehicle and a distance of the head worn item of protective equipment relative to the at least one side mirror of the vehicle; and
    determine the direction of the gaze of the operator of the vehicle by determining, based on the angle of the head worn item of protective equipment relative to the at least one side mirror of the vehicle and the distance of the head worn item of protective equipment relative to the at least one side mirror of the vehicle, the direction of the gaze of the operator of the vehicle to a rear of a side of the vehicle.

18. The computer program product of claim 17, wherein the program instructions, when executed by the at least one processor, further cause the at least one processor to determine the direction of the gaze of the operator of the vehicle by:
    obtaining vehicle characteristic data associated with a geometric spacing, a reflective surface normal, and an angular position of the at least one side mirror relative to a centerline of the vehicle and a steering axis of the vehicle; and
    determining, based on the angle of the head worn item of protective equipment relative to the at least one side mirror of the vehicle, the distance of the head worn item of protective equipment relative to the at least one side mirror of the vehicle, and the geometric spacing, the reflective surface normal, and the angular position of the at least one side mirror relative to the centerline of the vehicle and the steering axis of the vehicle, the direction of the gaze of the operator of the vehicle to the rear of the side of the vehicle.

19. The computer program product of claim 18, wherein the program instructions, when executed by the at least one processor, further cause the at least one processor to obtain vehicle characteristic data by receiving, via a wireless communication from the vehicle, the vehicle characteristic data associated with the geometric spacing, the reflective surface normal, and the angular position of the at least one side mirror relative to the centerline of the vehicle and the steering axis of the vehicle.

20. The computer program product of claim 18, wherein the program instructions, when executed by the at least one processor, further cause the at least one processor to obtain vehicle characteristic data by:
    determining, based on the one or more images, a type of the vehicle; and
    determining, based on the type of the vehicle, the vehicle characteristic data associated with the geometric spacing, the reflective surface normal, and the angular position of the at least one side mirror relative to the centerline of the vehicle and the steering axis of the vehicle.

* * * * *